United States Patent [19]

Matsushita et al.

[11] Patent Number: 5,016,194

[45] Date of Patent: May 14, 1991

[54] IMAGE FORMING APPARATUS

[75] Inventors: Tsukasa Matsushita; Hidechika Kumamoto, both of Osaka, Japan

[73] Assignee: Mita Industrial Co., Ltd., Osaka, Japan

[21] Appl. No.: 431,931

[22] Filed: Nov. 6, 1989

[30] Foreign Application Priority Data

Nov. 11, 1988 [JP] Japan .................. 63-286253

[51] Int. Cl.$^5$ .................................. G06F 15/00
[52] U.S. Cl. ...................... 364/519; 346/154
[58] Field of Search .................. 364/518–523; 346/154; 355/40; 358/296, 300

[56] References Cited

U.S. PATENT DOCUMENTS

4,712,909 11/1989 Matsushita et al. .......... 364/519

Primary Examiner—Arthur G. Evans
Attorney, Agent, or Firm—Beveridge, DeGrandi & Weilacher

[57] ABSTRACT

In an image forming apparatus including a digital image processing device, an overlay memory stores predetermined image data. The image data stored in the overlay memory is read at a predetermined timing in a predetermined cycle and composite data is made from the image data and image data outputted from a line memory. Since the image data stored in the overlay memory is read at the predetermined timing in the predetermined cycle, various kinds of overlaid image which may include a space-magnified image can be made by arbitrarily selecting the timing and cycle for reading.

7 Claims, 6 Drawing Sheets

IMAGE FORMING APPARATUS

BACKGROUND OF THE INVENTION

The present invention relates to an image forming apparatus including a digital image processing device and, more particularly, to a digital copying machine, a laser printer, a digital facsimile, a copying machine having an analog device and digital device in combination, etc.

Conventionally, some digital copying machines are capable of overlay-copying. For example, in a well-known overlay function, a part of a first original is read so as to have a memory, such as a RAM, store it, and the stored data is read from the memory as image data in copying a second original, so that the second original can be copied with the image data overlaid.

In some apparatus, specific image data, for example, specific word data such as "SECRET" is stored in a memory in advance, so that an original can be copied with the image data overlaid through an overlay function.

In using an overlay function in a conventional digital copying machine and the like, it is not possible for image data of a first original, which is read from a memory, to be magnified so that the image data is overlaid on a second original and it is also not possible for the image data of the first original to be space-magnified so that it is overlaid on the second original. Herein, "space-magnifying" means resolving image data not successively into units of predetermined, dots and magnifying the image data by spacing the dot units outward with respect to one another.

SUMMARY OF THE INVENTION

Accordingly, it is an object of the present invention to provide an image forming device for an image processing apparatus including a digital image processing device, capable of forming various kinds of overlaid image which may include a space-magnified image.

The present invention provides an image forming apparatus for electrostatically forming a composite image by reading image data which is stored in advance at a predetermined timing in a predetermined cycle and overlaying it on other image data.

According to the present invention, since the image data stored in advance are read at a predetermined timing in a predetermined cycle, the stored image data can be read in dots by spacing dot units out or can be read repeatedly. A space-magnified image can be made by selecting the timing and cycle for reading, and that can be overlaid on the inputted image data.

BRIEF DESCRIPTION OF THE DRAWINGS

These and other objects and advantages of the present invention is more fully apparent from the detailed description when read in conjunction with the accompanying drawings, wherein:

FIG. 3 is a schematic block diagram of an architecture of a digital copying machine;

FIGS. 5 and 6 are timing charts presented for explaining the operation of the image processing unit 4 shown in FIGS. 1A and 1B.

DESCRIPTION OF THE PREFERRED EMBODIMENT

While there will be described an image formation device for a digital copying machine as a preferred embodiment of the present invention, it will be understood that the present invention should not be limited to the digital copying machine, but can be applied to an image formation apparatus having a digital image processing device, such as a combination type copying machine including both digital and analog functions, a laser printer, a digital facsimile, etc.

Figure 2A:
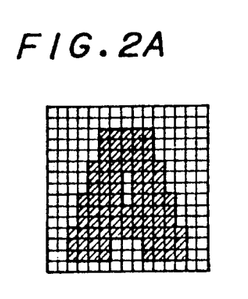
FIGS. 2A, 2B and 2C are diagrams presented for explaining the theory in making a composite image by space-magnifying data to be overlaid in 3 times magnifications.
Figure 2B:
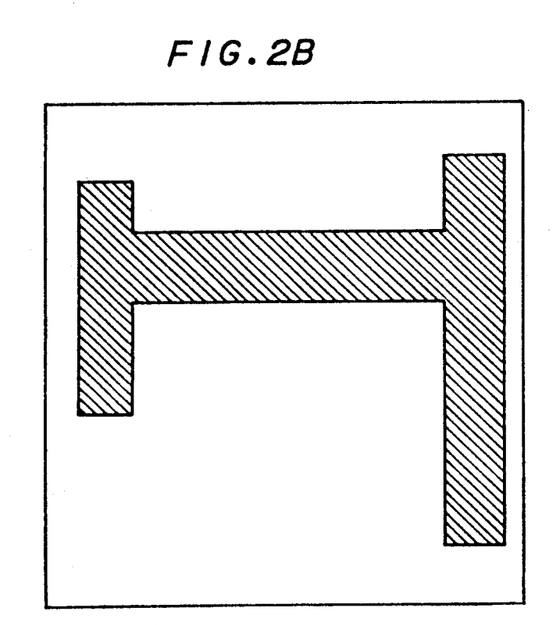

Now an overlay function will be explained in conjunction with FIGS. 2A-2C. The overlay function means to make a composite copy shown in FIG. 2(C) by overlaying data stored in a memory, namely, data to be overlaid shown in FIG. 2(A) on data read with an image scanner or the like, show in FIG. 2(B).

The embodiment of the present invention is characterized in that a timing and a cycle in reading from the memory the data (A) to be overlaid are appropriately selected, so that the data (A) are enlarged into the data (C) through space-magnifying process by spacing dot units of the data (A) out.

Figure 2C:
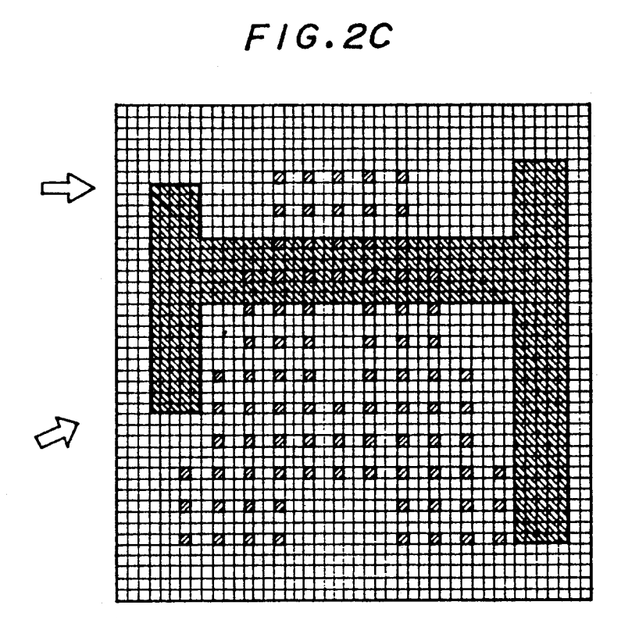

Referring to FIG. 2(C), the data three times as large as the original data to be overlaid are obtained through space-magnifying process. Magnification for space-magnifying can be arbitrary and, moreover, a process other than the space-magnifying process can be performed.

Then, a constitution of the embodiment will be described. FIG. 3 is a block diagram showing a schematic architecture of the digital copying machine related to the preferred embodiment.

An original 2 is positioned on an original holder 1. Contents of the original 2 are read by an image scanner 3 and transferred to the image processing unit 4. The image processing unit 4, which is to be explained in detail below, comprises storage means for storing image data, image data reading means for reading the image data stored in the storage means at a predetermined timing in a predetermined cycle, and composite data making means for making a composite data from the image data read from the storage means and the image data inputted from the image scanner 3. The image processing unit 4 outputs an electric signal to an LSU 5. The LSU includes a laser wiring unit, etc., drives the laser in response to the electric signal received from the image processing unit 4, and directs a laser beam to a print device 6. The print device 6 includes a photoreceptor in which an image is electrostatically formed. The photoreceptor is exposed with the laser beam to form an electrostatic latent image. The latent image is developed into a toner image, and the toner image is transferred to a copy paper 7 and fused thereon. Thus a copying process is finished.

Although the contents of the original 2 is directly read by the image scanner 3 in this embodiment, they may be illuminated with light from a lighting system so that reflecting light from the original 2 may be read by an image sensor, such as a CCD. The image scanner 3 and the image sensor usually include an A/D converting circuit and, therefore, a signal outputted therefrom is a digital signal.

Figure 1A:
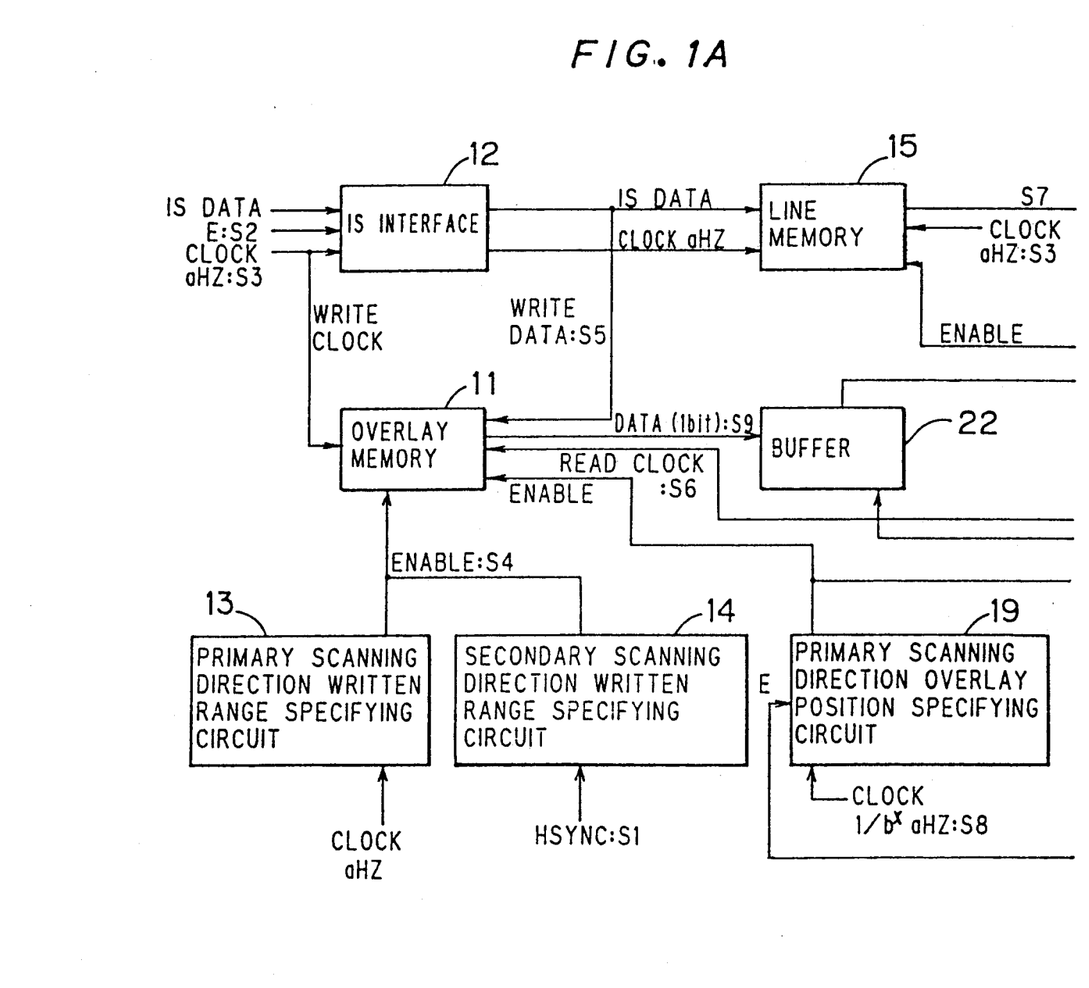
FIGS. 1A and 1B are block diagrams showing a circuit architecture of an image processing unit 4 in a digital copying machine in accordance with the preferred embodiment of the present invention.
Figure 1B:
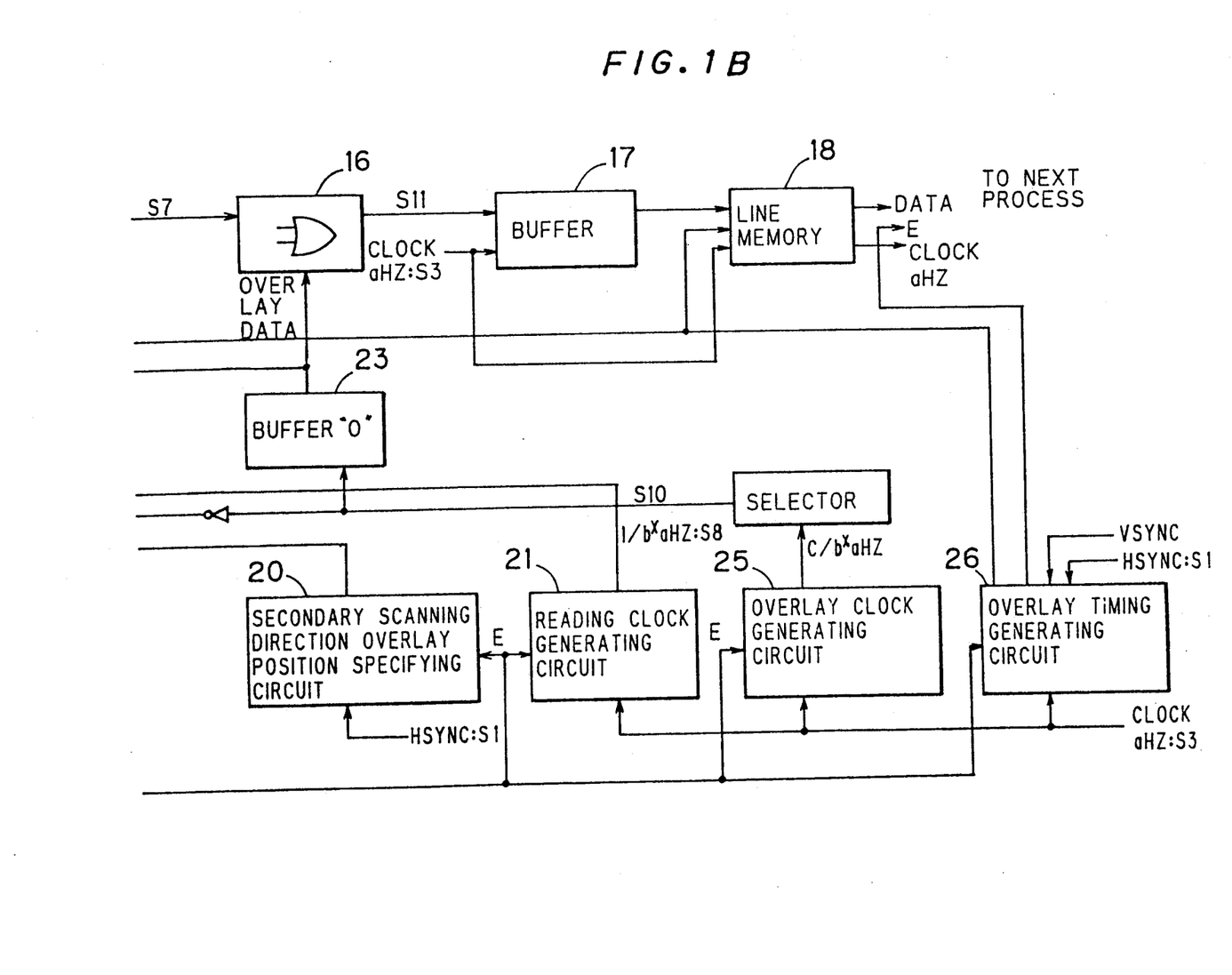

FIGS. 1A and 1B represent a block diagram showing a circuit architecture of the image processing unit 4 in detail. A general structure and operation of the image processing unit 4 will be described with reference to FIGS. 1A and 1B.

The image processing unit 4 includes an overlay memory 11. The overlay memory 11 may be a reloadable memory including a RAM, for example. Namely, contents in the overlay memory can be changed with data read by the image scanner 3 (referred to as "IS data" below).

The IS data read by the image scanner 3 can be written in the overlay memory 11 through an IS interface 12. When data are written in the overlay memory 11, a range to be written is specified by written range specifying circuits 13, 14 with regard to a primary scanning direction and a secondary scanning direction of the image scanner 3. More specifically, in writing the IS data in the overlay memory 11 in accordance with a clock of aHz, the written range specifying circuit 13 related to the primary scanning direction outputs a timing signal for starting and ending writing in the primary scanning direction in accordance with the clock of aHz. The written range specifying circuit 14 related to the secondary scanning direction outputs a timing signal for starting and ending writing in the secondary scanning direction in accordance with a horizontal synchronization signal HSYNC. Both of the circuits 13, 14 are applied to the overlay memory 11 as an operation enable signal ENABLE. Accordingly, a written range for writing the IS data, which is given two-dimensionally as (primary scanning direction) x (secondary scanning direction), can be specified.

The written range specified with regard to the primary and secondary scanning directions by both of the written range specifying circuits 13, 14 can be varied by a tablet device (not shown) connected to the digital copying machine. Namely, the tablet device is set in a written range specifying mode to specify two points on a tablet plate, so that a rectangular region having the two points as opposite vertices can be inputted as a required written range to the range specifying circuits 13, 14 related to the primary and secondary scanning directions, respectively.

When the data read by the image scanner 3 are processed to transfer to the LSU 5, the IS data read by the image scanner 3 are temporarily stored in the line memory 15 through the IS interface 12 and then outputted to the LSU 5 through a composite data making circuit 16, a buffer 17 and a line memory 18. The composite data making circuit 16, the buffer 17 and the line memory 18 are circuits necessary for making a composite data from the IS data and data to be overlaid which are read from the overlay memory 11.

In making a composite data, contents in the line memory 15 are read in accordance with a reading clock of aHz and transferred to the composite data making circuit 16.

On the other hand, while the overlay memory 11 is enabled by an overlay position specifying circuit 19 related to the primary scanning direction and an overlay position specifying circuit 20 related to the secondary scanning direction, data in the overlay memory 11 can be read. The overlay position specifying circuit 19 related to the primary scanning direction and the overlay position specifying circuit 20 related to the secondary scanning direction determine a timing at which the overlay memory 11 is enabled to read, so that a range in the IS data is specified to which the data read from the overlay memory 11 is overlaid.

A range specified by the overlay position specifying circuit 19 related to the primary scanning direction and the overlay position specifying circuit 20 related to the secondary scanning direction can be varied by a tablet device and so on similar to the range specified by the written range specifying circuits 13, 14.

Data in the overlay memory 11 are read one bit at a time in accordance with a reading clock of a/bHz applied from a reading clock generating circuit 21. "b" is a magnification determining constant. A buffer 22 is connected in parallel with a buffer 23 always keeping "0", and these buffers 22, 23 are selectively operated by a selector 24. The selector 24 selects the buffer 22 or 23 in response to a clock of a·c/bHz from an overlay clock generating circuit 25 where "c" is also a magnification determining constant. Either the buffer 22 or the buffer 23 is selected to apply its output to the composite data making circuit 16. One-bit units of data read from the overlay memory 11 ar spaced out by switching between the buffers 22 and 23, and thus a space-magnifying process is performed.

The composite data making circuit 16 superposes the IS data received from the image scanner 3 on an output from the buffer 22 or 23 to output composite data to the next processing circuit through the buffer 17 and the line memory 18.

Each circuit of the image processing unit 4 is enabled by a signal E received from the overlay timing generating circuit 26. The overlay timing generating circuit 26 outputs the signal E in accordance with a vertical synchronizing signal VSYNC and a horizontal synchronizing signal HSYNC which are reading and scanning start signals for the image scanner 3.

Then, the operation of the circuit shown in FIGS. 1A and 1B will be described referring to specific data.

Figure 4A:
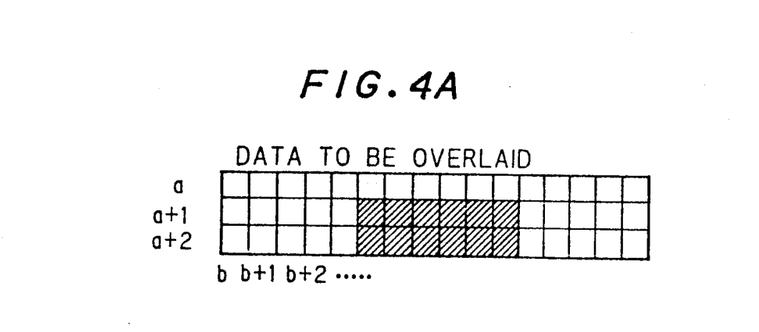
FIGS. 4A, 4B and 4C are diagrams showing an example of each of data to be overlaid, image data and composite data.
Figure 4B:
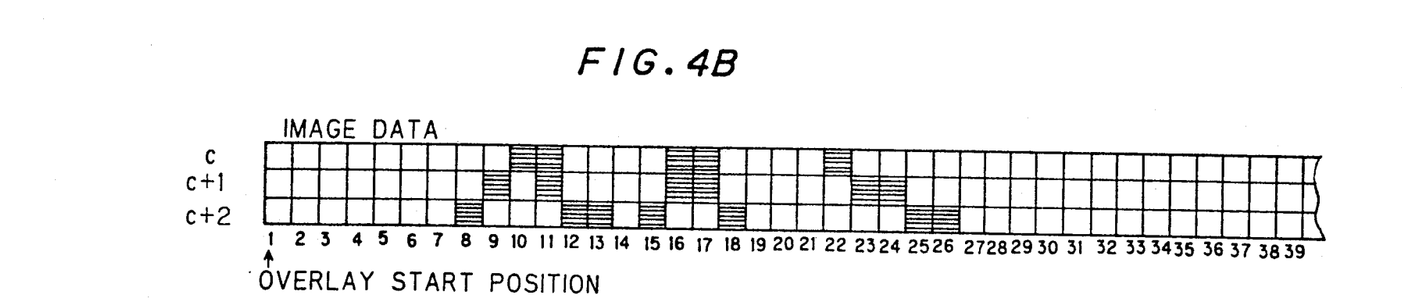
Figure 4C:
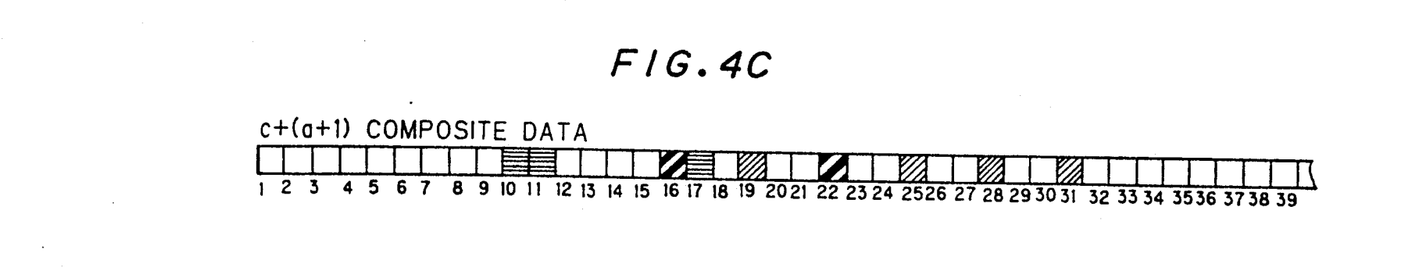
Figure 5:
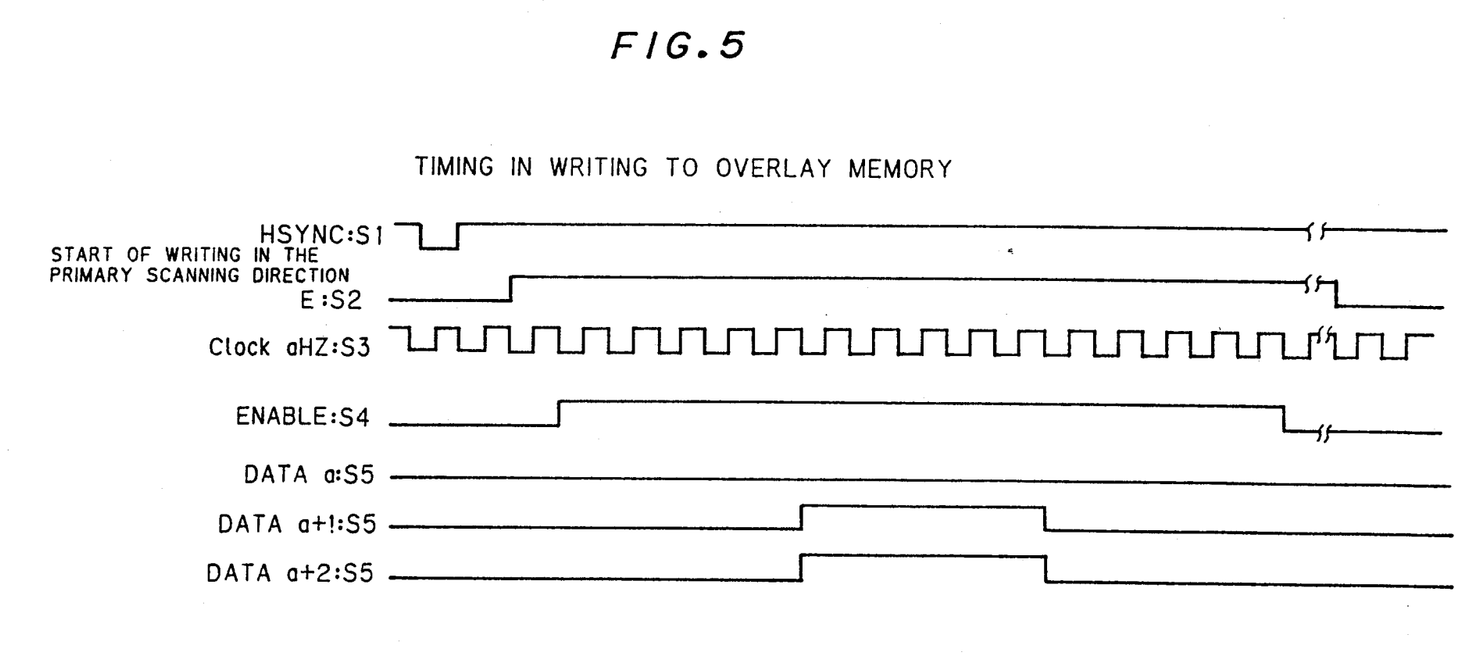
FIG. 5 is a diagram showing a timing in writing the data to be overlaid to an overlay memory.

FIG. 4(A) shows an example of data to be overlaid which are stored in the overlay memory 11, FIG. 4(B) shows the IS data (image data on which other data are overlaid) read by the image scanner 3 and FIG. 4(C) shows contents of composite data made from raw c in (B) and raw (a+1) in (A). FIG. 5 is a diagram showing a timing in writing data to be overlaid, shown in FIG. 4(A) to the overlay memory 11 in FIGS. 1A and 1B.

Then, the operation of writing data to the overlay memory 11 will be described with reference to FIGS. 1A, 1B, 3, 4(A) and 5. To facilitate the understanding, timing signals in FIG. 5 are marked with symbols S1 to S5, respectively, and signal lines in the circuit in FIGS. 1A and 1B related to those signals are marked with like symbols, respectively.

When an inverted horizontal synchronizing signal HSYNC S1 is turned from "Low" to "High" and the image scanner 3 starts reading an original in the primary scanning direction, a signal E S2 outputted from the overlay timing generating circuit 26 turns "High", so that the IS interface 12 is enabled. The IS interface 12 and the overlay memory 11 receive a clock signal S3 of aHz.

Meanwhile, the overlay memory 11 is enabled while receiving an enable signal S4 from the written range specifying circuit 13 related to the primary scanning direction and the written range specifying circuit 14 related to the secondary scanning direction. Accordingly, when the overlay memory 11 is enabled, data a, (a+1), (a+2) S5 outputted from the IS interface 12 are written to the overlay memory 11 in accordance with the writing clock aHz S3.

Thus, contents in the overlay memory 11 can be rewritten with data read by the image scanner 3.

Figure 6:
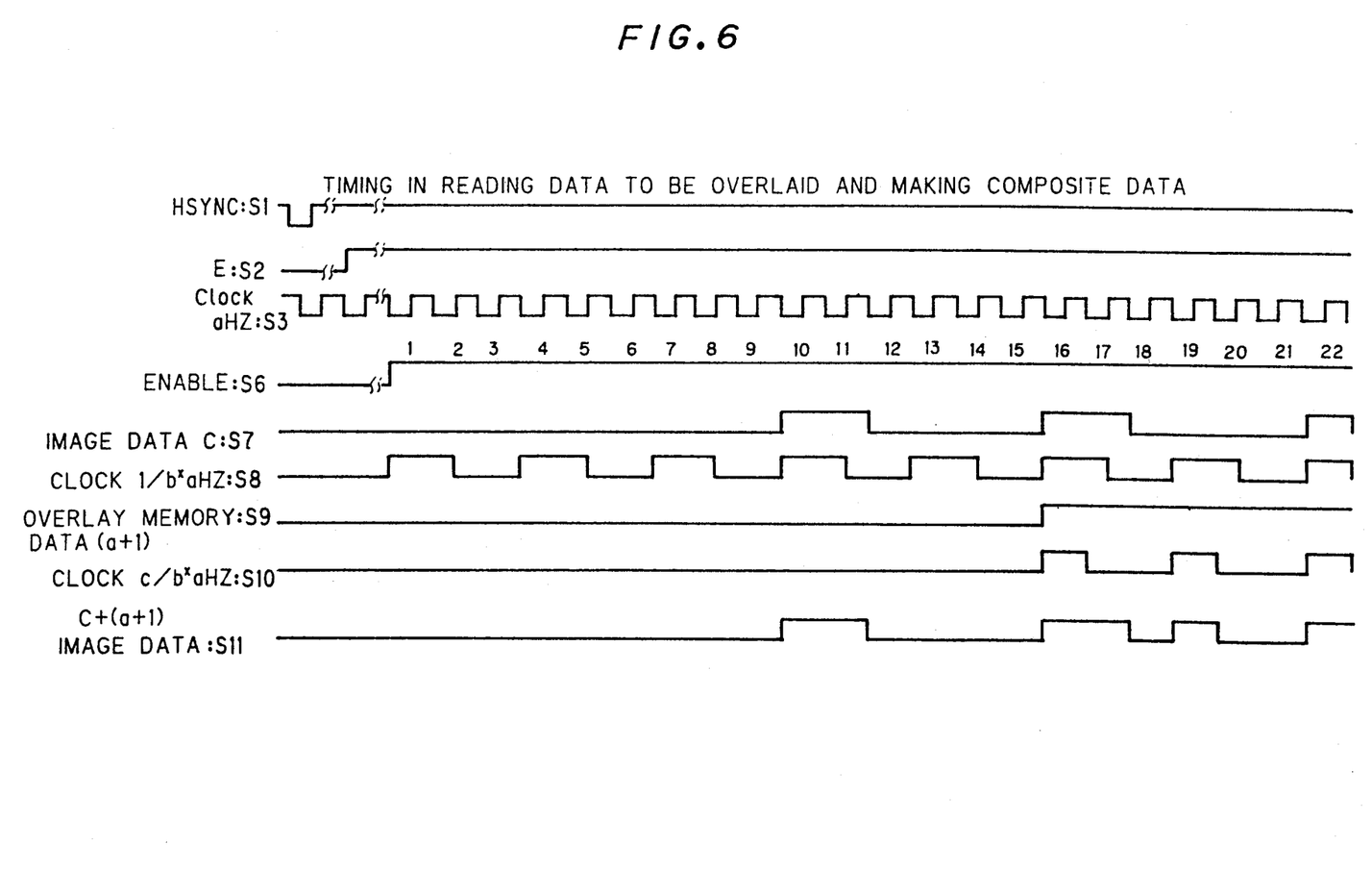
FIG. 6 is a diagram showing a timing in reading the data to be overlaid and a timing in making composite data.

FIG. 6 is a timing diagram in reading data from the overlay memory 11 and making composite data from the data and IS data, using the circuit shown in FIGS. 1A and 1B. Similar to FIG. 5, timing signals are marked with symbols S1 to S11, respectively, and signal lines corresponding to those of the circuit in FIGS. 1A and 1B are marked with like symbols.

The composite image making operation employing an overlay function will be described with reference to FIGS. 1A, 1B, 3, 4A-4C and 6. Herein, a case where a composite image is made by data in raw (a+1) in FIG. 4(A) and raw c in FIG. 4(B) will be explained as an example.

Data of the original 2 are read by the image scanner 3, and the image data c S7 are applied to the line memory 15 through the IS interface 12 and outputted to the composite data making circuit 16.

On the other hand, when the enable signal S6 outputted from the overlay position specifying circuit 19 related to the primary scanning direction and the overlay position specifying circuit 20 related to the secondary scanning direction turns "High", the overlay memory 11 is enabled, so that the data to be overlaid, (a+1) S9, which are stored in the overlay memory 11 are read one bit at a time in dots in accordance with the reading clock S8 of a/bHz which is applied from the reading clock generating circuit 2, and applied to the buffer 22.

The selector 24 switches between the buffer 22 keeping the data to be overlaid, (a+1) S9, and the buffer 23 always keeping "0" data in accordance with a timing of the clock S10 of a·c/bHz, and an output from the buffer 22 or 23 is selectively applied to the composite data making circuit 16.

Thus, image data c+(a+1) S11 are obtained as a composite output from the composite data making circuit 16.

In this embodiment, the data to be overlaid, which is stored in the overlay memory 11, is superposed as space-magnified data enlarged three times as large as the original data by selecting a timing of reading data to be overlaid and a cycle of applying the data to the composite data making circuit 16. However, if the reading timing of the overlay memory 11 is set at aHz and the selector 24 always selects the buffer 22, the data to be overlaid can be enlarged without space-magnifying.

Further, the reading timing of the overlay memory 11 can be changed line by line so that the pattern of the overlay data is transformed.

Instead of the composite data making circuit 16 making composite data from image data and data to be overlaid, those data may be individually applied to the LSU 5 and copied in different colors in the print device 6. For example, if the data to be overlaid is a mark such as "SECRET", the mark may be copied in red and the image data in black.

While there has been illustrated and described what is at present considered to be a preferred embodiment of the present invention, it will be understood by those skilled in the art that various changes and modifications may be made, and equivalents may be substituted for elements thereof without departing from the true scope of the invention. It is intended that this invention not be limited to the particular embodiment disclosed as the best mode contemplated for carrying out the invention, but that the invention will include all embodiments falling within the scope of the appended claims.

What is claimed is:

1. An apparatus for image forming, comprising:
   a photoconductor on which an electrostatic image is formed;
   first image data inputting means for inputting first image data;
   storing means for storing second image data;
   second image data inputting means for inputting second image data stored in said storage means;
   image data synthesizing means for synthesizing into composite image data said first image data inputted with said first image data inputting means and said second image data inputted with said second image data inputting means;
   control means for controlling a cycle and timing of inputting said second image data to said image data synthesizing means in relation to a cycle and timing of inputting said first image data to said image data synthesizing means, such that the formed image size and arrangement can be varied in accordance with the timing of input and cycle of input of said first and second image data; and
   exposing means for exposing said photoconductor depending on the composite image data provided by said data synthesizing means.

2. An apparatus according to claim 1, further comprising image data writing means for writing second image data inputted with said first image data inputting means in said storing means.

3. An apparatus according to claim 1, wherein said control means controls a cycle in which said second image data is inputted to said image data synthesizing means, whereby said cycle in which said second image data is inputted to said image data synthesizing means is longer than said cycle in which said first image data is inputted to said image data synthesizing means.

4. An apparatus according to claim 1, wherein said control means comprises:
   image data reading means for reading at the predetermined timing and the predetermined cycle said second image data being inputted by said second image data inputting means;
   first read data storing means for storing each bit of data read by said image data reading means;
   second read data storing means for always storing zero; and
   selecting and supplying means for selecting said first read data storing means or said second read data storing means alternatively in the predetermined cycle, and for supplying contents in the selected read data storing means to said image data synthesizing means.

5. An apparatus for image forming, comprising:
   a photoconductor on which an electrostatic image is formed;
   first image data inputting means for inputting first image data;
   storing means for storing second image data;

second image data inputting means for inputting second image data stored in said storing means;

first exposure means for exposing said photoconductor depending on said first image data inputted with said first image data inputting means;

second exposure means for exposing said photoconductor depending on said second image data inputted with said second image data inputting means;

control means for controlling a cycle and timing of inputting said second image data to said second exposure means in relation to a cycle and timing of inputting said first image data to said first exposure means, such that the formed image size and arrangement can be varied in accordance with the timing of input and cycle of input of said first and second image data;

developing means for developing a first image formed through exposure by said first exposure means and a second image formed through exposure by said second exposure means; and transferring means for transferring said first image and said second image developed by said developing means onto a common sheet of recording paper.

6. An apparatus according to claim 5, wherein said developing means includes first developing means for developing an image formed on said photoconductor by said first exposure means, and second developing means for developing an image formed on said photoconductor by said second exposure means.

7. An apparatus according to claim 6, wherein said first and second developing means include toner of different colors.

* * * * *